(No Model.)

L. TILTON.
SHUTTER WORKER.

No. 314,493. Patented Mar. 24, 1885.

WITNESSES:
John W. Deemer
C. Sedgwick

INVENTOR:
L. Tilton
BY Munn & Co.
ATTORNEYS.

UNITED STATES PATENT OFFICE.

LEONARD TILTON, OF BROOKLYN, NEW YORK.

SHUTTER-WORKER.

SPECIFICATION forming part of Letters Patent No. 314,493, dated March 24, 1885.

Application filed May 17, 1884. (No model.)

*To all whom it may concern:*

Be it known that I, LEONARD TILTON, of Brooklyn, in the county of Kings and State of New York, have invented a new and Improved Shutter-Worker, of which the following is a full, clear, and exact description.

This invention relates to certain improvements in my new and improved shutter-worker, shown and described in Letters Patent No. 297,032, which were granted to me April 15, 1884; and the invention has for its object to cheapen the construction of the worker, and to provide the joints thereof with means whereby the parts of the worker may be permanently locked for holding the shutter at any desired position.

Reference is to be had to the accompanying drawings, forming a part of this specification, in which similar letters of reference indicate corresponding parts in all the figures.

Figure 1:
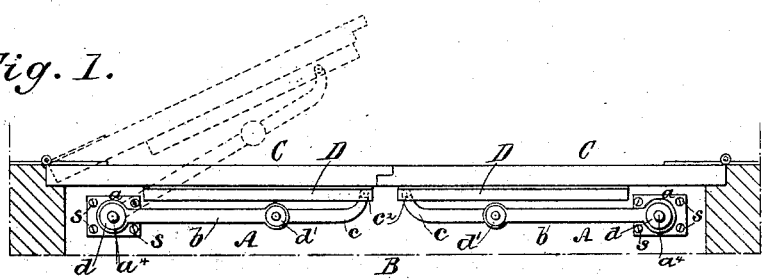
Figure 2:
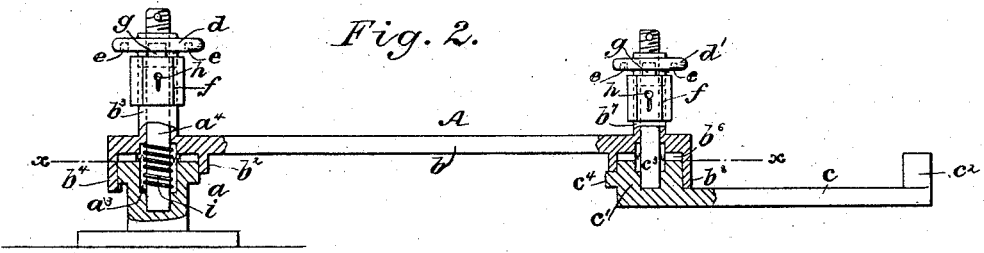
Figure 3:
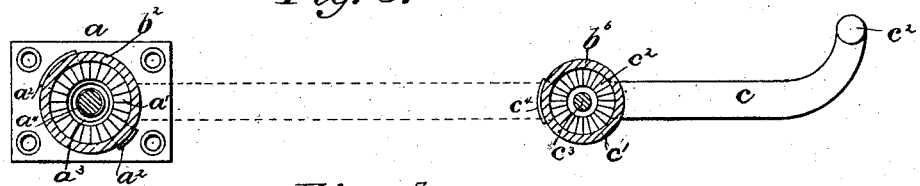
Figure 4:
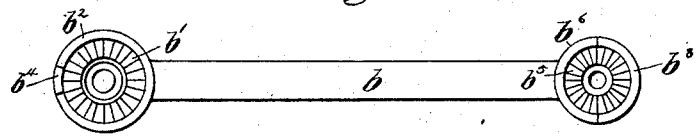

Figure 1 shows in plan view my new shutter-worker applied to the window sill and shutter. Fig. 2 is a sectional elevation of one of my improved shutter-workers. Fig. 3 is a sectional plan view of the worker, taken on the line $x\,x$ of Fig. 2; and Fig. 4 is an inverted plan view of the main section of the worker.

The shutter-worker A is composed of the flanged stud $a$, secured to the window-sill B by the screws $s\,s$, the main section $b$, and the outer section, $c$, which latter is curved and formed at its outer end with the knob $c^2$, which is adapted to run under a flanged plate, D, secured to the lower portion of the window-blind C, as shown in Fig. 1. The stud $a$ is made round, and is cast with the serrations or teeth $a'$ upon its upper surface, and with two side lugs, $a^2$, and is formed with the central cavity, $a^3$, from the center of which rises the bolt $a^4$, which is screw-threaded at its upper end to receive the thumb-nut $d$, and is secured to the stud $a$, preferably by having the stud cast upon it. The main section $b$ is cast at its inner end with the teeth or serrations $b'$, round cup $b^2$, and upwardly-projecting sleeve $b^3$, the cup and sleeve being adapted to fit, respectively, over the stud $a$ and bolt $a^4$, so that the serrations $b'$ of the section $b$ rest in contact with the serrations $a'$ of the stud $a$; and the lower rear edge of the cup $b^2$ is cast with the projection $b^4$, which acts as a stop against the lugs $a^2$ of the stud $a$, to limit the pivotal movement of the worker upon the stud $a$ in both directions. At its outer end the main section $b$ is cast with the serrations $b^5$, round cup $b^6$, upwardly-projecting sleeve $b^7$, and downwardly-projecting flange $b^8$, which latter, in connection with the lug $c^4$, formed upon the outer section, $c$, serves to limit in both directions the pivotal movement of the said outer section, $c$. The outer section, $c$, of the worker is cast with the circular hub $c'$, which has the serrations $c^2$ formed upon its upper surface, and which fits in the cup $b^6$ of the main section $b$, so that the serrations $c^2$ engage with the serrations $b^5$ in the said cup $b^6$, and the hub $c'$ of the section $c$ has the bolt $c^3$ rising from its center, which passes up through the sleeve $b^7$ of the main section $b$ and receives the thumb-nut $d'$ upon its upper end, by which nut the section $c$ is secured to the outer end of the main section $b$ of the shutter-worker. The thumb-nuts $d\,d'$ have cavities $e$ formed in their under surfaces, (shown in dotted lines in Fig. 2,) and the sleeves $b^3\,b^7$ are provided at the upper ends with the locks $f$, which have sliding bolts $g$, adapted to be operated by a key inserted in the key-holes $h$ of the lock for raising the bolts into and withdrawing them from the cavities $e$, thus enabling the nuts $d\,d'$ to be locked upon or unlocked from the bolts $a^4\,c^3$ of the main section $b$, as desired.

Upon the bolt $a^4$ of the stud $a$ is placed the coiled spring $i$, which is partially inclosed in the cavity $a^3$ of the said hub $a$, and acts against the main section $b$ of the worker for lifting the worker, so that the serrations $b'$ of the main section $b$ will clear the serrations $a'$ of the stud $a$ when the thumb-nut $d$ is screwed upward upon the bolt $a^4$, thus permitting the whole worker to be turned upon the stud $a$ for opening or closing the blind. The blind being closed, in order to open it entirely—that is, to swing it back against the wall of the building—the nut $d'$ will first be screwed upward upon the bolt $c^3$, which will lower the section $c$ and disengage the serrations $c^2$ from the serrations $b^5$ of the main section $b$. The section $c$ will then be turned outward as far as it will go, and the nut $d'$ will then be screwed down, which will secure the section $c$ at its most outward position. Then the nut $d$ will be screwed upward upon the bolt $a^4$, which will permit the spring $i$ to lift the worker slightly, so as to disengage the serrations $b'$ from the serrations $a'$ of the stud $a$, and then the whole worker will be swung outward, which movement will swing the blind entirely open and back against the wall of the building, and then the nut $d$ will be screwed down again to engage the serrations $b'$ with the serrations $a'$ of the stud $a$, which will secure the worker, and thus hold the blind open. To close the blind, the reverse of this operation will be followed.

To hold the blind at any intermediate point, either or both of the sections $b\ c$ of the worker may be swung outward, as may be found most convenient; and should it be desired to open the blind partially and to lock it, so that children or other persons cannot change the position of the blind, the nuts $d\ d'$, after the blind has been given its proper position, may be locked upon the bolts $a^4\ c^3$ by a key inserted in the locks $f$, so that only a person having the key can operate or change the position of the shutter-worker.

Having thus fully described my invention, I claim as new and desire to secure by Letters Patent—

1. The combination, with a sectional shutter-worker, of locks mounted on one of said sections, and adapted to engage a part of the section upon which said lock-carrying section pivots, substantially as set forth.

2. The stud $a$, provided with bolt $a^4$, and formed with the serrations $a'$, in combination with the main section $b$, formed with the serrations $b'$, and placed upon the bolt and stud, and held by the nut $d$, substantially as and for the purposes set forth.

3. The stud $a$, provided with the bolt $a^4$, combined with the section $b$ and interposed spring $i$, the hub and section being serrated, and means for holding said serrated surfaces engaged against the action of the spring, substantially as and for the purposes set forth.

4. The section $b$, formed with the sleeve $b^3$, and the lock $f$, attached to said sleeve, in combination with the stud $a$, bolt $a^4$, and nut $d$, having recesses to receive the bolt of the lock, substantially as set forth.

5. The stud $a$, having bolt $a^4$, and lugs $a^2$, in combination with the section $b$, fitted upon the bolt and hub, and formed with the stop $b^4$, substantially as and for the purposes set forth.

6. The section $b$, formed on its outer end with a circular cup, $b^6$, and serrations $b^5$, on its upper inner surface, in combination with the outer section, $c$, formed with a circular hub, $c'$, provided with the bolt $e^3$, and formed with the serrations $c^2$ on its upper surface, and a nut for holding said serrations engaged, substantially as set forth.

7. The section $b$, formed with the sleeve $b^7$ at its outer end, and the lock $f$, attached to said sleeve, in combination with the section $c$, bolt $c^3$, and nut $d'$, having cavities in its under surface for receiving the bolt of the lock, substantially as described.

8. The section $c$, formed with the hub $c'$ and lug $c^4$, in combination with the bolt $c^3$, nut $d'$, and section $b$, formed with the projection $b^8$, substantially as and for the purposes set forth.

9. The shutter-worker herein shown and described, consisting of the serrated stud $a$, serrated sections $b\ c$, and the bolts $a^4\ c^3$, in combination with the nuts $d\ d'$ and locks $f$, for locking the nuts, substantially as described.

LEONARD TILTON.

Witnesses:
 H. A. WEST,
 C. SEDGWICK.